United States Patent
Hur

(10) Patent No.: US 8,001,673 B2
(45) Date of Patent: Aug. 23, 2011

(54) CLAMPING DEVICE FOR VEHICLE BODY TRANSFER CART

(75) Inventor: Myeon Gi Hur, Ulsan (KR)

(73) Assignee: Hyundai Motor Company, Seoul (KR)

( * ) Notice: Subject to any disclaimer, the term of this patent is extended or adjusted under 35 U.S.C. 154(b) by 860 days.

(21) Appl. No.: 12/006,205

(22) Filed: Dec. 31, 2007

(65) Prior Publication Data

US 2009/0095797 A1    Apr. 16, 2009

(30) Foreign Application Priority Data

Oct. 12, 2007    (KR) .................. 10-2007-0103143

(51) Int. Cl.
*B23Q 7/00*    (2006.01)
(52) U.S. Cl. ............... 29/709; 29/559; 29/714
(58) Field of Classification Search ............... 29/407.01, 29/407.09, 407.1, 464, 468, 559, 709, 712, 29/714, 799, 822; 228/2.1, 212
See application file for complete search history.

(56) References Cited

U.S. PATENT DOCUMENTS

| | | | | |
|---|---|---|---|---|
| 5,265,317 A * | 11/1993 | Angel | ............................. | 29/429 |
| 6,389,698 B1 * | 5/2002 | Malatier | ...................... | 29/897.2 |
| 6,546,616 B2 * | 4/2003 | Radowick | ........................ | 29/720 |
| 7,469,473 B2 * | 12/2008 | Savoy | ........................ | 29/897.2 |

FOREIGN PATENT DOCUMENTS

| | | |
|---|---|---|
| JP | 06-183343 | 7/1994 |
| JP | 2005-279799 | 10/2005 |
| KR | 1999-027949 A | 4/1999 |
| KR | 10-2002-0053911 A | 7/2002 |

* cited by examiner

*Primary Examiner* — Jermie E Cozart
(74) *Attorney, Agent, or Firm* — Edwards Angell Palmer & Dodge LLP; Peter F. Corless

(57) ABSTRACT

The present invention provides a clamping device for a vehicle body transfer cart, in which a rotation unit for rotating a cart unit, an air supply unit for supplying air to the cart unit, and an electrical signal unit for transmitting an electric signal to the cart unit are installed in a single processing device such that the structure of the device is simplified, the number of components is decreased to reduce manufacturing and installation costs, the structure of the cart unit is improved to be suitable for the clamping device, and thus the weight of the cart unit is reduced.

6 Claims, 6 Drawing Sheets

CLAMPING DEVICE FOR VEHICLE BODY TRANSFER CART

CROSS-REFERENCE TO RELATED APPLICATION

This application claims under 35 U.S.C. §119(a) on Korean Patent Application No. 10-2007-0103143, filed on Oct. 12, 2007, the entire contents of which are incorporated herein by reference.

BACKGROUND (a) Technical Field

The present invention relates to a clamping device for a vehicle body transfer cart. More particularly, the present invention relates to a clamping device for a vehicle body transfer cart, in which a rotation unit, an air supply unit, and an electrical signal unit are installed in a single processing device such that rotation, air supply, and electrical power supply operations are performed in a single process, thus simplifying the structure of the device, reducing the number of components to save manufacturing and installation costs, and simplifying the structure and reducing the weight of a cart unit for the clamping device.

(b) Background Art

In general, in order to weld or assemble various components to a vehicle body using a robot in a vehicle production line such as a vehicle body assembly line, the components are held by a clamp or set to a jig to perform a welding or assembly process.

Since such clamps or jigs have different shapes according to shapes of, e.g., inner panels or outer panels of vehicles, they should have different shapes according to the kind of vehicles.

Meanwhile, most vehicle manufacturing companies do not produce a single kind of vehicle but produce various kinds of vehicles to meet clients' tastes. It is thus necessary to provide an equipment that can satisfy all kinds of vehicles, but it would impose a heavy economic burden on the companies.

Accordingly, it is advantageous to provide an equipment that can be commonly applied to many kinds of vehicles, if possible.

Like this, vehicle body processing systems, which perform electrical power supply and air supply operations in different rotation types and manners according to the kind of vehicle, are built on the vehicle body assembly lines.

As a conventional technique related to a clamping device of a cart for transferring a vehicle body, Japanese Patent Application Publication No. 1994-183343 discloses a power coupler including an electric power supply unit and an air supply unit.

Moreover, Korean Utility Model Registration No. 425,970 discloses an apparatus for driving a vehicle kind converting unit in a production line for various kinds of vehicles.

However, the conventional techniques have a problem in that the electric power supply, air supply and rotation operations are not performed in a single process for a cart unit.

The problem of the conventional clamping device for the vehicle cart will be described in detail with reference to FIGS. 1 and 2.

FIG. 1 is a schematic diagram of a conventional clamping system for a vehicle cart, and FIG. 2 is a schematic diagram of an air supply device in the conventional clamping system for a vehicle cart.

As shown in FIG. 1, a rotation unit, an air supply unit and an electric supply unit are installed in each of a plurality of processing devices 100, 110, 120 and 130 with respect to a cart unit. Accordingly, four rotation units 140, an air supply unit and an electric power supply unit are required in each cart unit.

Accordingly, in the conventional clamping system, the space for the installation of the plurality of devices is increased and the burden of the transfer device is increased due to the excessive weight of the cart unit.

Moreover, as depicted in the air supply device 130 of FIG. 2, a connection sensor 150 for detecting whether or not a cylinder is clamped and a transmission coupler 160 are established in each processing device, thus complicating distributing wires. Furthermore, since a dog bracket sensor 170 for detecting the kind of vehicle is mounted on four surfaces of each device, various kinds of sensors are required.

In addition, since an air supply cylinder 180 for supplying air is mounted on one surface of an air receiving unit of each device, the number of air supply cylinder 180 required is also increased. In the case where the kind of vehicle to be processed is added to utilize the space of each device, the respective devices may interfere with each other.

As a result, the conventional clamping device for the vehicle body transfer cart has problems in that the structure is complicated due to the increase in the number of the components and it takes a lot of time to design the device due to the complicated structure. Moreover, the manufacturing cost is increased due to the increase in the number of the components, it is difficult to maintain and repair the device, and it occupies a large assembly space.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made in an effort to solve the above-described drawbacks and one object of the present invention is to provide a clamping device for a vehicle body transfer cart, in which a rotation unit for rotating a cart unit, an air supply unit for supplying air to the cart unit, and an electrical signal unit for transmitting an electric signal to the cart unit are installed in a single processing device such that rotation, air supply, and electrical power supply operations are performed in a single process, thus simplifying the structure of the device and improving the structure of the cart unit to reduce the weight of the cart unit.

In order to accomplish the above objects, one embodiment of the present invention provides a clamping device for a vehicle body transfer cart, the clamping device comprising: a rotation unit for rotating a cart unit; an air supply unit for supplying air to the cart unit; and an electrical signal unit for transmitting an electrical signal to the cart unit, wherein the rotation unit comprises: a hooking unit adapted to insert and mount the cart unit; an index mounted on one side of the hooking unit; a coupling mounted on the bottom of the index to transmit the power of the driving motor; and the driving motor mounted on one side of the coupling to rotate, rotation angle of which driving motor is divided by the index.

In a preferred embodiment, a first slider is provided on one side of the rotation unit to move the rotation unit so as not to interfere with the cart unit during entrance of the cart unit, and a guide is installed on the bottom of the first slider to guide the movement of the rotation unit by the first slider.

Preferably, a vehicle kind detecting sensor is installed on the lateral side of the hooking unit to detect the kind of vehicle to which the cart unit is applied.

Suitably, a rotation detecting sensor is provided on the top of the index to detect the rotation angle of the index rotated by the operation of the driving motor.

More preferably, the air supply unit comprises an air supply cylinder mounted on one side of the rotation unit to supply air, and a second slider mounted on one side of the air supply cylinder to prevent the cart unit from interfering with the air supply cylinder during the entrance of the cart unit.

More suitably, the electrical signal unit comprises an output unit mounted on the top of the air supply unit to generate an electrical signal, and a power coupler connected to the bottom of the output unit to wirelessly transmit the electrical signal generated from the output unit to an input unit of the cart unit.

Figure 1:
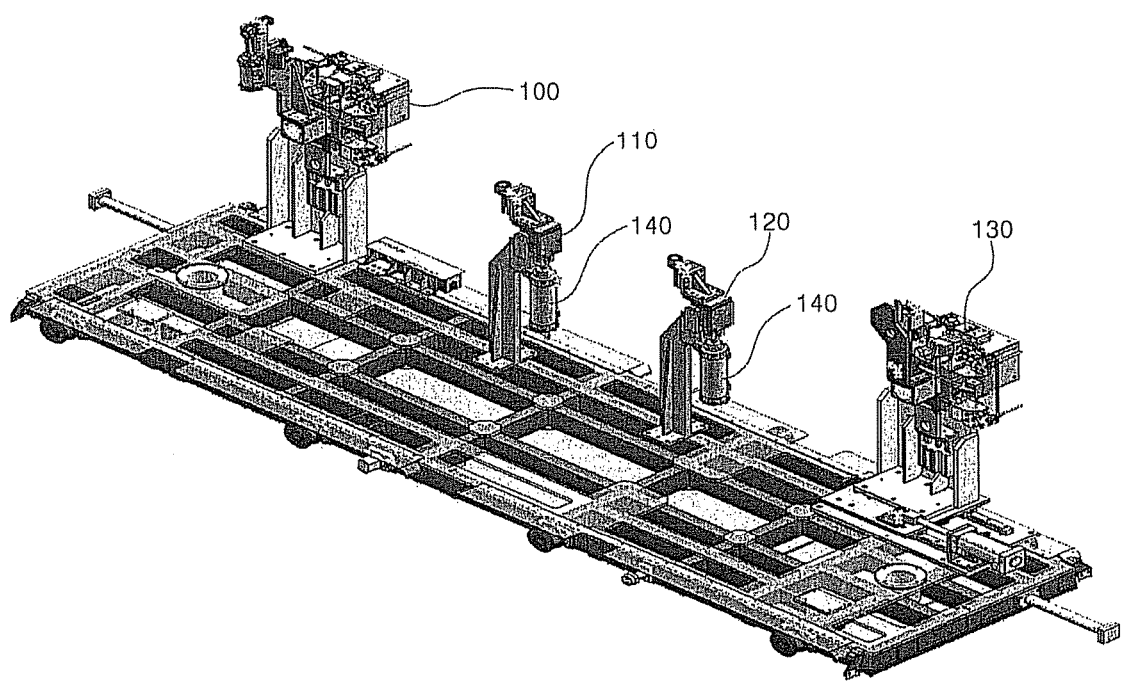
FIG. 1 is a schematic diagram of a conventional clamping system for a vehicle cart.
Figure 2:
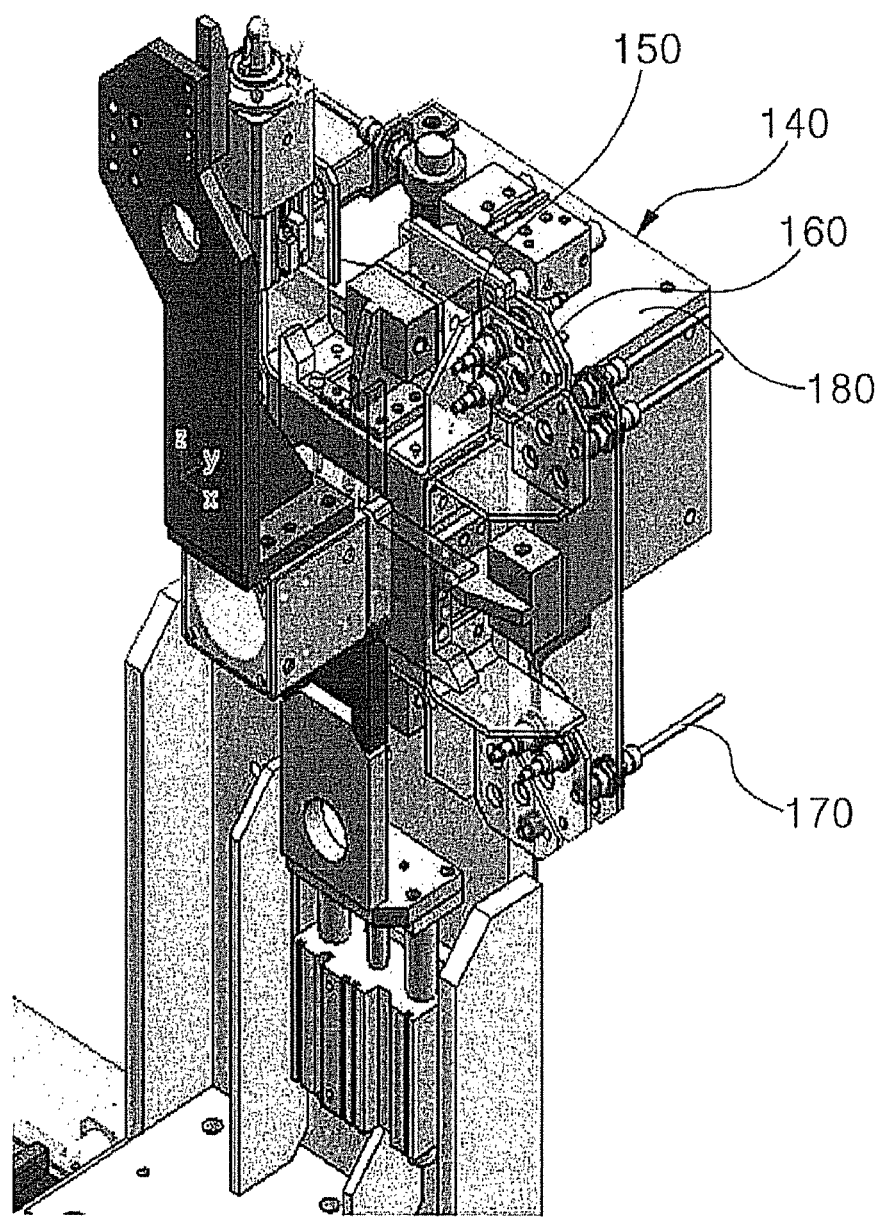
FIG. 2 is a schematic diagram of an air supply device in the conventional clamping system for a vehicle cart.

Reference numerals set forth in the Drawings includes reference to the following elements as further discussed below:

| 200: cart unit | 210: rotation unit |
| 220: air supply unit | 230: electrical signal unit |
| 240: hooking unit | 250: driving motor |
| 260: coupling | 270: index |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 3:
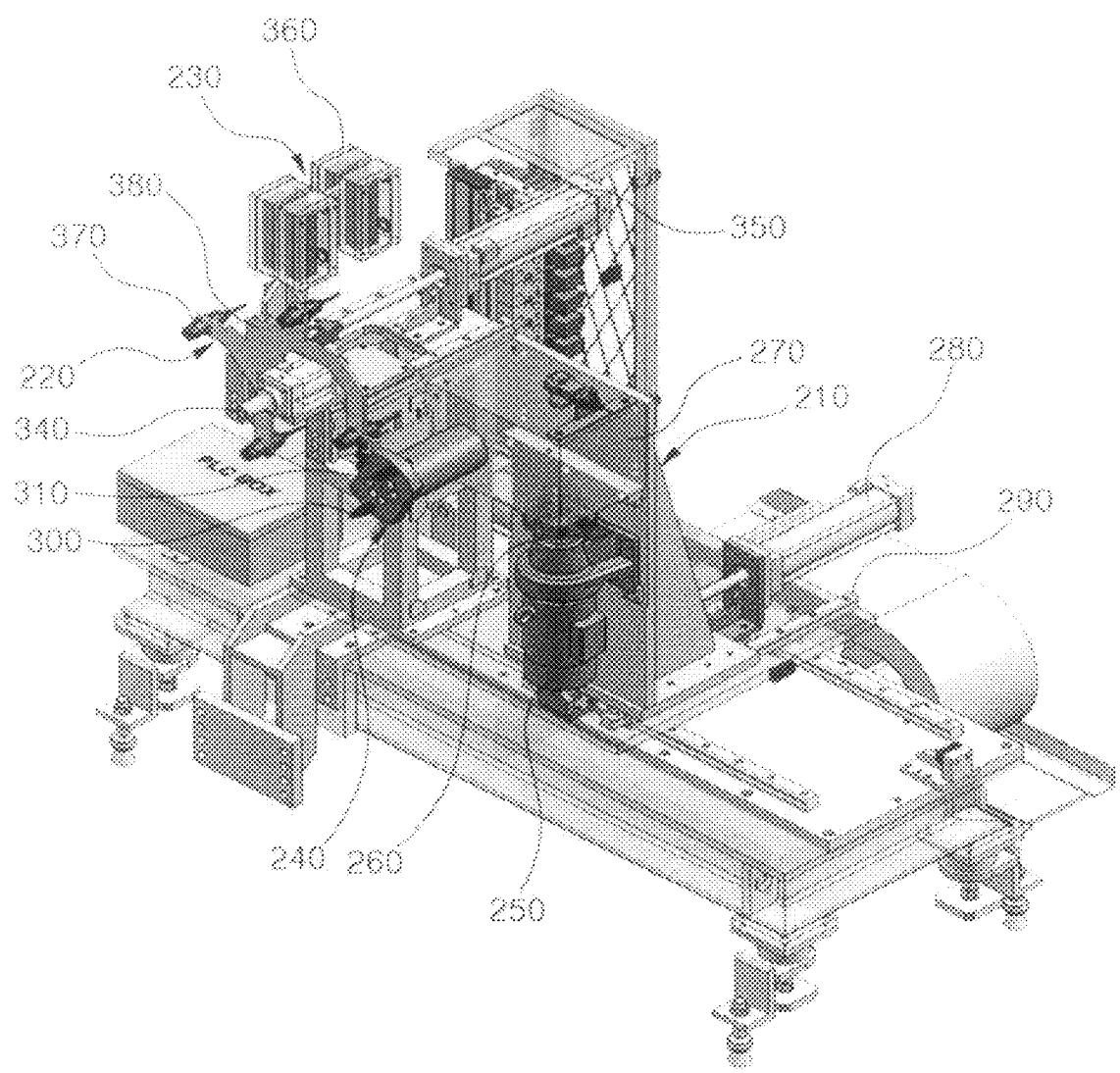
FIG. 3 is a perspective view of a clamping device for a vehicle body transfer cart in accordance with a preferred embodiment of the present invention.
Figure 4:
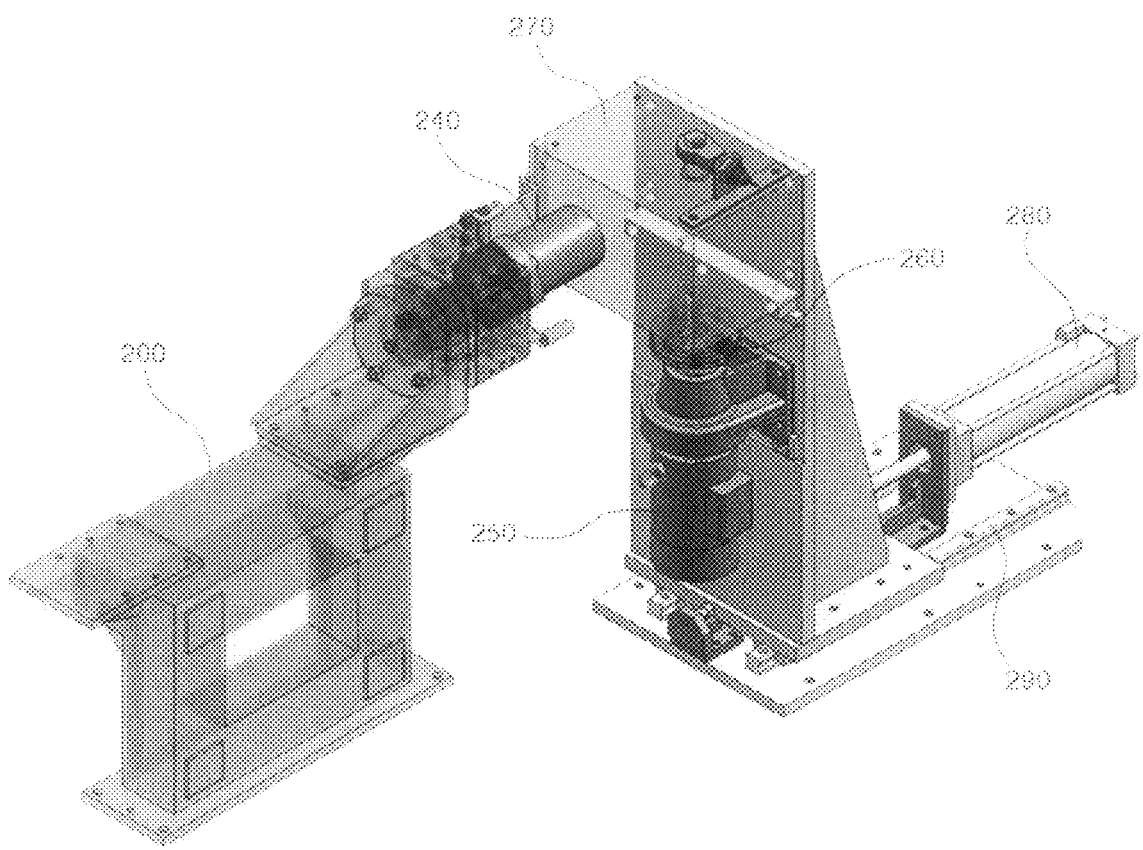
FIG. 4 is a schematic diagram of a rotation unit of the clamping device for a vehicle body transfer cart in accordance with a preferred embodiment of the present invention.
Figure 5:
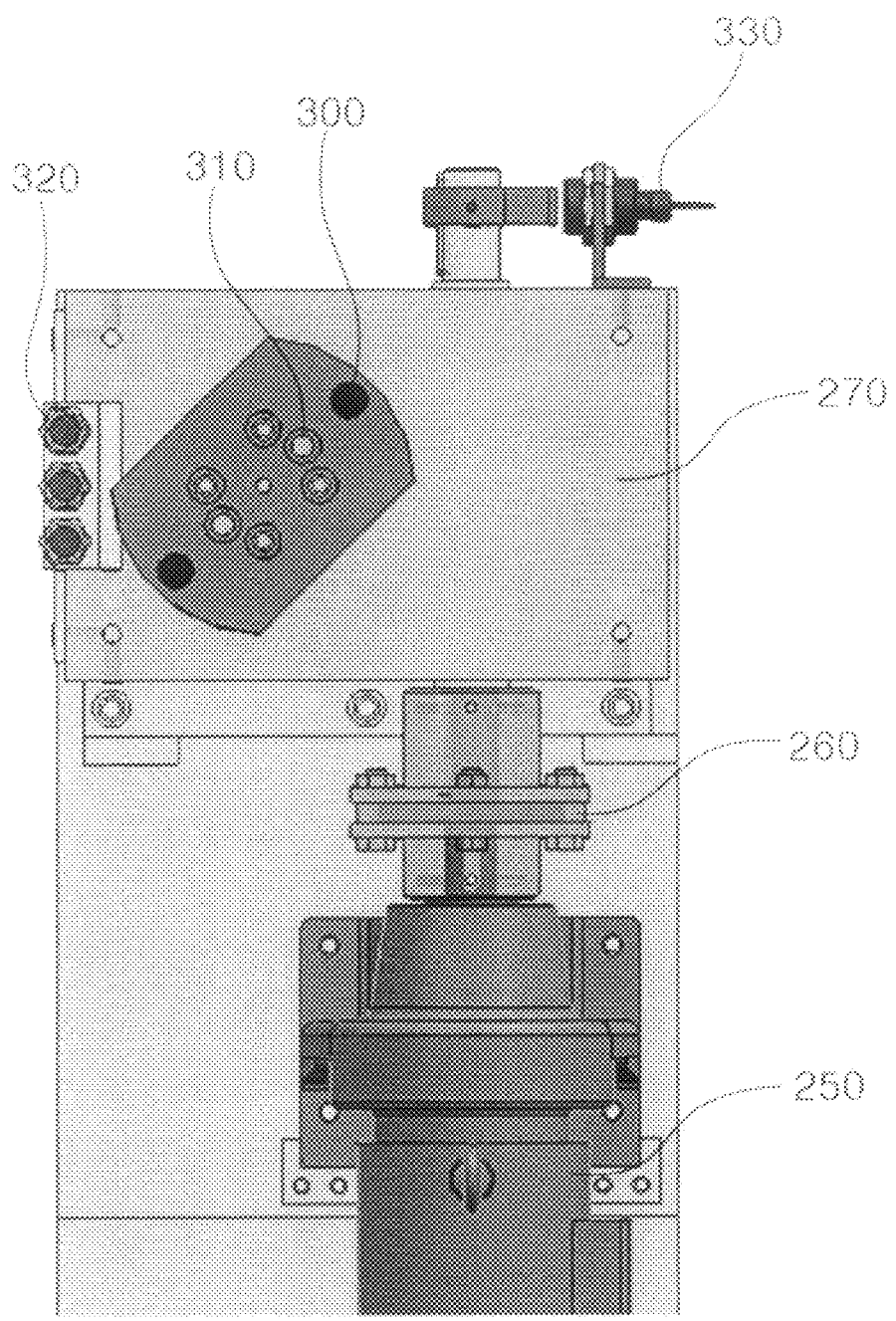
FIG. 5 is a front view of the rotation unit of the clamping device for a vehicle body transfer cart in accordance with a preferred embodiment of the present invention.
Figure 6:
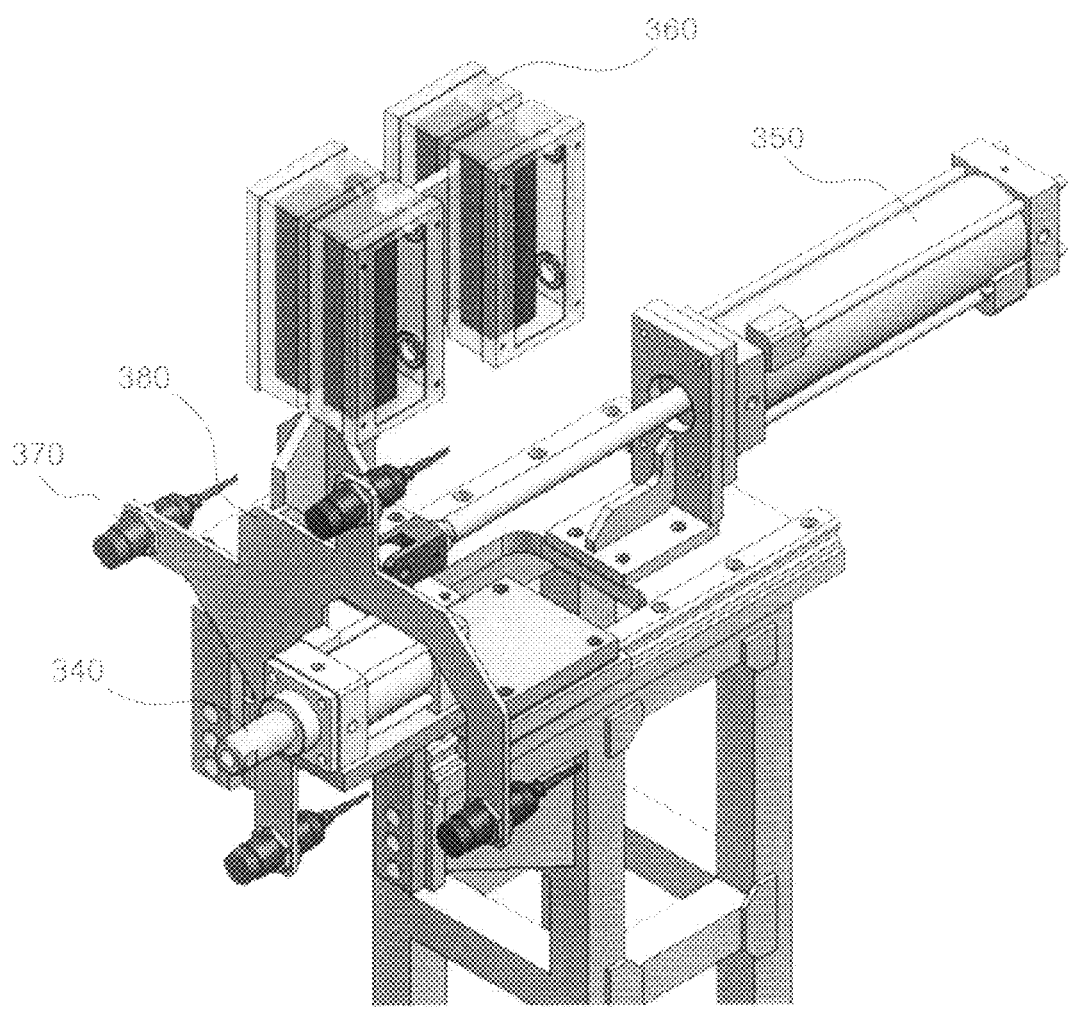
FIG. 6 is a schematic diagram of an air supply unit and an electric power supply unit of the clamping device for a vehicle body transfer cart in accordance with a preferred embodiment of the present invention.

FIG. 3 is a perspective view of a clamping device for a vehicle body transfer cart in accordance with a preferred embodiment of the present invention, FIG. 4 is a schematic diagram of a rotation unit of the clamping device for a vehicle body transfer cart in accordance with a preferred embodiment of the present invention, FIG. 5 is a front view of the rotation unit of the clamping device for a vehicle body transfer cart in accordance with a preferred embodiment of the present invention, and FIG. 6 is a schematic diagram of an air supply unit and an electric power supply unit of the clamping device for a vehicle body transfer cart in accordance with a preferred embodiment of the present invention.

As shown in FIG. 3, the clamping device for a vehicle body transfer cart in accordance with a preferred embodiment includes a rotation unit 210 for rotating a cart unit 200, an air supply unit 220 for supplying air to the cart unit 200, and an electrical signal unit 230 for transmitting an electrical signal to the cart unit 200.

The rotation unit 210 includes a hooking unit 240 in which the cart unit 200 is inserted and mounted, an index 270 mounted on one side of the hooking unit 240 to divide the rotation angle of a driving motor 250, a coupling 260 mounted on the bottom of the index 270 to transmit the power of the driving motor 250, and the driving motor 250 mounted on one side of the coupling 260.

Moreover, a first slider 280 is provided on one side of the rotation unit 210 to move the rotation unit 210 so as not to interfere with the cart unit 200 during the entrance of the cart unit 200, and a guide 290 is installed on the bottom of the first slider 280 to guide the movement of the rotation unit 210 by the first slider 280.

At this time, the rotation unit 210 is being moved backward before the cart unit 200 is entered and, the rotation unit 210 is moved forward by the first slider 280 during the entrance of the cart unit 200 so that the cart unit 200 is connected to the hooking unit 240. In this case, the first slider 280 may be formed as a cylinder facilitating the forward and backward movement.

Here, the hooking unit 240 includes a plurality of hollow holes 310 and a plurality of hooking pins 300 formed on one surface thereof. Accordingly, as the cart unit 200 is inserted into the hooking pins 300, the cart unit 200 is mounted on the clamping device.

As shown in FIG. 5, a vehicle kind detecting sensor 320 is installed on the lateral side of the hooking unit 240 to detect the kind of vehicle, to which the cart unit 200 is applied, and transmit a vehicle kind signal to the index 270. Then, the index 270 adjusts the rotation angle of the hooking unit 240 connected to the index 270 according to the vehicle kind signal.

Moreover, a rotation detecting sensor 330 is provided on the top of the index 270 to detect the rotation angle of the index 270 rotated by the operation of the driving motor 250 and transmit a rotation angle signal to the index 270 or the driving motor 250.

As shown in FIG. 6, the air supply unit 220 includes an air supply cylinder 340 for supplying air and a second slider 350 mounted on one side of the air supply cylinder 340 to prevent the cart unit 200 from interfering with the air supply cylinder 340 during the entrance of the cart unit 200.

In this case, it is desirable that an air supply hole (not depicted) of the cart unit 200 coincides with the center line of the air supply cylinder 340 after the cart unit 200 is rotated by the rotation unit 210. Moreover, urethane is used in the cart unit 200 to come in close contact with the air supply cylinder 340 being entered into the air supply hole of the cart unit 200, thus preventing the supplied air from leaking to the outside.

Moreover, the second slider 350 moves the air supply cylinder 340 toward the cart unit 200 so that the air supply cylinder 340 is mounted to the air supply hole of the cart unit 200 during the entrance of the cart unit 200. When the process of the cart unit 200 is completed after the air supply cylinder 340 supplies air, the second slider 350 moves the air supply cylinder 340 in the opposite direction of the cart unit 200 so that the cart unit 200 is transferred to the next process.

The electrical signal unit 230 includes an output unit 360 for generating an electrical signal indicating whether or not the cart unit 200 is clamped and a power coupler 370 for wirelessly transmitting the electrical signal generated from the output unit 360 to an input unit (not depicted) of the cart unit 200.

In this case, a plurality of power couplers 370 are mounted on a bracket 380 surrounding the air supply cylinder 340, and the output unit 360 is installed on the top of the bracket 380.

In order to facilitate the wireless transmission and reception of the electrical signal between the cart unit 200 and the power coupler 370, it is preferable that the interval between the input unit of the cart unit 200 and the power coupler 370 be maintained at 8±1.5 mm during the entrance of the cart unit 200.

To maintain such an interval, it is desirable that the second slider 350 moves the bracket 380, on which the power coupler 370 is mounted, to adjust the position of the power coupler 370 in consideration of the position of the cart unit 200 rotated by the rotation unit 210 and supplied with air by the air supply cylinder 340.

Next, the operation of the clamping device for a vehicle body transfer cart with the above configuration in accordance with the present invention will be described.

Before the entrance of the cart unit 200, the first and second sliders 280 and 350, mounted on one side of the rotation unit 210 and the air supply unit 220, respectively, move the rotation unit 210 and the air supply unit 220 in the direction opposite to the entrance direction of the cart unit 200, thus preventing interference between the cart unit 200 and the components of the clamping device.

When the cart unit 200 is moved to the clamping device, the first slider 280 moves the rotation unit 210 toward the cart unit 200 so that the hooking unit 240 of the rotation unit 210 is connected to one side of the cart unit 200.

Subsequently, the vehicle kind detecting sensor 320 installed on the lateral side of the hooking unit 240 detects the kind of vehicle to which the cart unit 200 is joined and transmits a vehicle kind signal to the index 270. The index 270 receiving the vehicle kind signal adjusts the rotation angle of the cart unit 200 mounted to the hooking unit 240 according to the vehicle kind signal.

Next, the second slider 350 moves the air supply unit 220 toward the cart unit 200 so that the air supply cylinder 340 of the air supply unit 220 is inserted into the air supply hole of the cart unit 200 rotated to an accurate position according to the kind of vehicle, and thus the air supply cylinder 340 supplies air to the cart unit 200.

Then, the output unit 360 installed on the top of the air supply unit 220 generates an electrical signal and the power coupler 370 connected to the output unit 360 wirelessly transmits the electrical signal to the input unit of the cart unit 200 such that the power coupler 370 and the input unit of the cart unit 200 transmit and receive the electrical signal to and from each other.

As described above, the clamping device for a vehicle body transfer cart provides the following advantageous effects:

(1) Since the rotation, electric power supply and air supply operation are performed in a single processing unit, the structure of the clamping device is simplified;

(2) With the decrease in the number of components of the clamping device, the manufacturing and installation costs are reduced; and (3) With the improved structure of the cart unit suitable for the clamping device, the structure of the cart unit is simplified, and thus the weight of the cart unit is reduced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A clamping device for a vehicle body transfer cart, the clamping device comprising:
   a rotation unit for rotating a cart unit;
   an air supply unit for supplying air to the cart unit; and
   an electrical signal unit for transmitting an electrical signal to the cart unit,
   wherein the rotation unit comprises:
   a hooking unit adapted to insert and mount the cart unit;
   an index mounted on one side of the hooking unit;
   a driving motor; and
   a coupling mounted on the bottom of the index to transmit power from the driving motor to the index; and
   wherein the index adjusts rotation angle of the hooking unit in accordance with a kind of vehicle.

2. The clamping device for a vehicle body transfer cart of claim 1, wherein a first slider is provided on one side of the rotation unit to move the rotation unit so as not to interfere with the cart unit during entrance of the cart unit, and a guide is installed on the bottom of the first slider to guide the movement of the rotation unit by the first slider.

3. The clamping device for a vehicle body transfer cart of claim 1, wherein a vehicle kind detecting sensor is installed on a lateral side of the hooking unit to detect the kind of vehicle to which the cart unit is applied.

4. The clamping device for a vehicle body transfer cart of claim 1, wherein a rotation detecting sensor is provided on the top of the index to detect rotation angle of the index rotated by the operation of the driving motor.

5. The clamping device for a vehicle body transfer cart of claim 1, wherein the air supply unit comprises an air supply cylinder mounted on one side of the rotation unit to supply air, and a second slider mounted on one side of the air supply cylinder to prevent the cart unit from interfering with the air supply cylinder during the entrance of the cart unit.

6. The clamping device for a vehicle body transfer cart of claim 1, wherein the electrical signal unit comprises an output unit mounted on the top of the air supply unit to generate an electrical signal, and a power coupler connected to the bottom of the output unit to wirelessly transmit the electrical signal generated from the output unit to an input unit of the cart unit.

* * * * *